United States Patent
Dai

(10) Patent No.: US 8,531,301 B2
(45) Date of Patent: Sep. 10, 2013

(54) WARNING DEVICE AND METHOD FOR INDICATING THAT A PART OF THE BODY IS STICKING OUT OF A WINDOW OF A VEHICLE

(75) Inventor: Lung Dai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 460 days.

(21) Appl. No.: 12/901,498

(22) Filed: Oct. 9, 2010

(65) Prior Publication Data

US 2011/0156913 A1 Jun. 30, 2011

(30) Foreign Application Priority Data

Dec. 28, 2009 (TW) .................................. 98145236

(51) Int. Cl.
*G08B 21/00* (2006.01)
(52) U.S. Cl.
USPC .................. 340/573.1; 340/438; 318/286

(58) Field of Classification Search
USPC .............. 340/438, 540, 573.1; 318/264, 286, 318/450
See application file for complete search history.

(56) References Cited

U.S. PATENT DOCUMENTS 6,262,661 B1 * 7/2001 Mahler et al. ................. 340/567
2008/0136358 A1 * 6/2008 Newman et al. .............. 318/286

* cited by examiner

*Primary Examiner* — Jeffery Hofsass
(74) *Attorney, Agent, or Firm* — Altis Law Group, Inc.

(57) ABSTRACT

A warning device includes a sensing unit, a comparing unit, a controlling unit and a warning unit. The sensing unit sense whether a part of the body of a person is sticking out of the window and generates a sensing signal. The comparing unit detects if the sensing signal is at least a predetermined value. If it is determined that the sensing signal is at least the predetermined value, a part of the body of the person is sticking out of the window and the comparing unit generates a warning signal. The warning unit is used for generating the alarm, and is capable of alternating between an alarm state and standby state. The controlling unit responds to the warning signal to detect whether the warning unit is in the alarm state, and disables the warning unit to start generating the alarm when the warning unit is in the standby state.

17 Claims, 2 Drawing Sheets

WARNING DEVICE AND METHOD FOR INDICATING THAT A PART OF THE BODY IS STICKING OUT OF A WINDOW OF A VEHICLE

BACKGROUND

1. Technical Field

The present disclosure relates to electronic devices; and particularly to a warning device and a warning method used by the warning device.

2. Description of Related Art

A vehicle, such as a car or a bus, is widely used. When a car or a bus is being driven, a person may carelessly stick some parts of the body, such as arms, out of a window of the vehicle, thus increasing the likelihood of injury.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
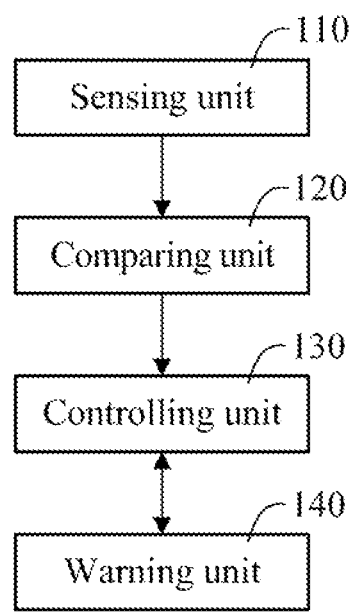
FIG. 1 is a block diagram of a warning device in accordance with one exemplary embodiment.
Figure 2:
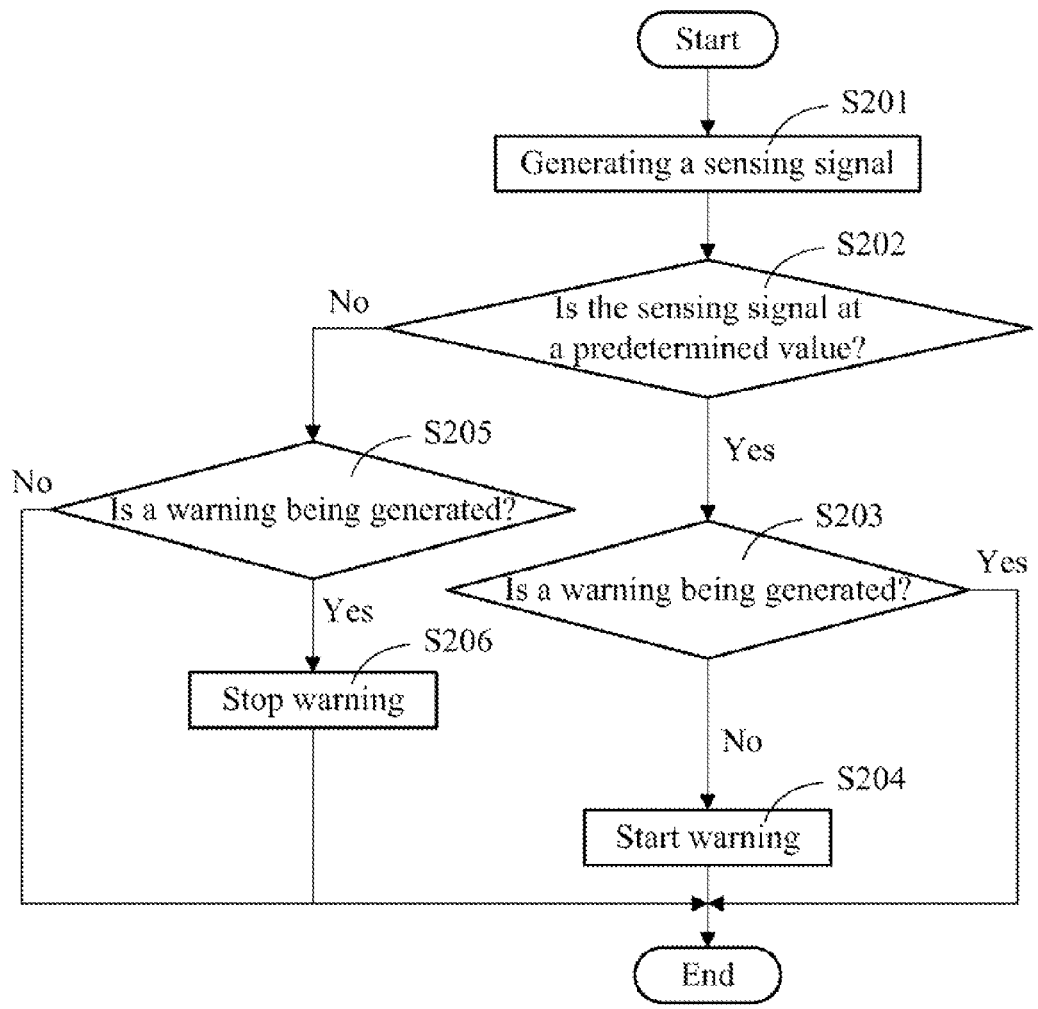
FIG. 2 is a flow chart of a warning method in accordance with another exemplary embodiment.

Referring to FIG. 1, a warning device 100 includes a sensing unit 110, a comparing unit 120, a controlling unit 130, and a warning unit 140. The warning device 100 is disposed on a vehicle such as a car or a bus for warning the operator of potential injury.

The sensing unit 110 is used for sensing whether a part of the body of a person in the vehicle is sticking out of a window of the vehicle, and if a part of the body is sticking out of the window generating a sensing signal. The sensing unit 110 may be an infrared sensor that senses infrared light radiated by the person within a sensing area and transforms the infrared light into the sensing signal. The sensing unit 110 may include at least one infrared sensor disposed on the window of the vehicle. The sensing signal is enhanced when a part of the body of the person is sticking out of the window. In other embodiments, the sensing unit 110 may be arranged around the window and/or doors.

The comparing unit 120 is used for determining whether the sensing signal is at least a predetermined value, if the sensing signal is at least a predetermined value, it determined that a part of the body of the person is sticking out of the window, and the comparing unit 120 generates a warning signal. If the sensing signal is less than the predetermined value, it is determined that no part of body of the person is sticking out of the window, and the comparing unit 120 generates a stopping signal.

The warning unit 140 is used for generating an alarm. The warning unit 140 is capable of alternating between an alarm state and a standby state.

The controlling unit 130 is used for responding to the warning signal to detect whether the warning unit 140 is in the standby state, and controlling the warning unit 140 to start generating the alarm when the warning unit 140 is in the standby state.

The controlling unit 130 is further used for responding to the stopping signal to detect whether the warning unit 140 is in the alarm state, and disable the warning unit 140 so that the warning unit 140 stops generating the alarm when the warning unit 140 is in the alarm state. As such, the warning unit 140 plays the alarm for warning the person to retract the part of his body sticking out of the window of the vehicle, thus injury to the person, caused by passing objects, outside of the vehicle may be decreased.

The sensing unit 110 and the other parts of the warning device 100 can be separately disposed on the different position of the vehicle, such as the sensing unit 110 disposed on the side of the window, the other parts of the warning device 100 are used as a whole disposed on the position different from the sensing unit 110 of the vehicle. The sensing unit 110 sends the sensing signal to the comparing unit 120 wirelessly. In the other embodiment, the sensing unit 110, the comparing unit 120 and the controlling unit 130 are used as a whole disposed on the window and/or window frame.

A warning method is used to control the warning device to generate an alarm. The warning device may be set on the vehicle, such as a car or a bus. The warning method includes the following steps.

In step S201, generating a sensing signal for determining whether a part of the body of the person is sticking out of the window. In the embodiment, whether a part of the body of a person is sticking out of the window by detecting heat generated within a sensing area via an infrared sensor.

In step S202, determining whether the sensing signal is at least a predetermined value. If the sensing signal is at least a predetermined value, it is determined that a part of the body of the person is sticking out of the window, and step S203 is implemented. If the sensing signal is less than the predetermined value, it is determined that no part of body of the person is sticking out of the window, step S205 is implemented.

In step S203, detecting whether the warning device generates the alarm. If it is determined that the warning device doesn't generate the alarm, step S204 is implemented. If it is determined that the warning device generates the alarm, the process ends.

In step S204, controlling the warning device to start generating the alarm, and the process ends.

In step S205, determining whether the warning device is generating the alarm. If it is determined that the warning device generates the alarm, step S206 is implemented. If it is determined that the warning device is not generating the alarm, the process ends.

In step S206, controlling the warning device to stop generating the alarm, and the process ends.

Using the above warning method, the warning device generates the alarm when a part of the body of the person is sticking out of the window, thus injuries to the person caused by objects sticking outside of the vehicle can be decreased.

It is to be understood, even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A warning device for a vehicle, comprising:
    a sensing unit adapted to sense whether a part of the body of a person in the vehicle is sticking out of a window of the vehicle and generate a sensing signal;
    a comparing unit adapted to determine whether the sensing signal is at least a predetermined value, when the sensing signal is at least a predetermined value, it is determined that a part of the body of a person is sticking out of the window, and the comparing unit generates a warning signal; and
    a warning unit adapted to output an alarm according to the warning signal.

2. The warning device of claim 1, wherein the warning unit is capable of alternating between an alarm state of generating the alarm and a standby state of stopping generating the alarm.

3. The warning device of claim 2, wherein the warning device further comprising a controlling unit; the controlling unit responds to the warning signal to detect whether the warning unit is in the standby state, and controls the warning unit to switch into the alarm state when the warning unit is in the standby state.

4. The warning device of claim 2, wherein when it is determined that the sensing signal is less than the predetermined value, the comparing unit generates a stopping signal.

5. The warning device of claim 4, wherein the warning device further comprising a controlling unit; the controlling unit responds to the stopping signal to detect whether the warning unit is in the alarm state, and switches the warning unit to the standby state when the warning unit is in the alarm state.

6. The warning device of claim 1, wherein, the comparing unit detects whether a part of the body of the person is sticking out of the window by detecting heat generated within a detecting area.

7. The warning device of claim 6, wherein the comparing unit is an infrared sensor.

8. The warning device of claim 1, wherein the sensing units and the other parts of the warning device can separately disposed on different positions of the vehicle.

9. The warning device of claim 1, wherein the sensing unit sends the sensing signal to the comparing unit wirelessly.

10. The warning device of claim 6, wherein the sensing unit, the comparing unit and the controlling unit are contained in a component disposed on the window.

11. A warning method for a vehicle adapted to control a warning device to switch between a alarm state of generating an alarm and a standby state of stopping generating the alarm, the warning method comprising:

generating a sensing signal for determining whether a part the of body of a person in the vehicle is sticking out of the window;
    detecting the sensing signal is at least a predetermined value;
    when the sensing signal is at least a predetermined value, a part of the body of the person is sticking out of the window; and
    switching the warning device to the alarm state.

12. The method according to claim 11, before step of generating an alarm further comprising:
    detecting whether the warning device is in the standby state; and
    when the warning device is in the standby state, controlling the warning device to switch to the alarm state.

13. The method according to claim 11, wherein when the sensing signal is less than the predetermined value, switching the warning device to the standby state.

14. The method according to claim 13, before step of generating the alarm further comprising:
    detecting the warning device is in alarm state; and
    when the warning device is in alarm state, controlling the warning device to switch to the standby state.

15. A warning device for a vehicle, comprising:
    a sensing unit adapted to sense whether a part of the body of a person in the vehicle is sticking out of a window of the vehicle and generate a sensing signal;
    a comparing unit adapted to compare sensing signal with a predetermined value and generate a corresponding signal; and
    a warning unit adapted to switch between an alarm state of generating an alarm and a standby state of stopping generating the alarm;
    wherein when the sensing signal is at least the predetermined value, it is determined that a part of the body of a person is sticking out of the window, the comparing unit generates a warning signal, the warning unit switches to the alarm state in response to the warning signal; when the sensing signal is less than the predetermined value, it is determined that no part of the body of a person is sticking out of the window, the comparing unit generates a stopping signal, the warning unit switches to the standby state in response to the stopping signal.

16. The warning device of claim 15, wherein the warning device further comprises a controlling unit; the controlling unit responds to the warning signal to detect whether the warning unit is in the standby state, and responds to the stopping signal to detect whether the warning unit is in the standby state, and controls the warning unit to switch to the alarm state when the warning unit is in the standby state.

17. The warning device of claim 16, wherein the controlling unit further responds to the stopping signal to detect whether the warning unit is in the alarm state, and controls the warning unit to switch to the alarm state when the warning unit is in the alarm state.

* * * * *